Oct. 13, 1970   R. R. HOCQ   3,533,721
BURNER VALVE FOR GAS-FUELED PIPE AND CIGARETTE LIGHTERS
Filed April 28, 1969   3 Sheets-Sheet 3
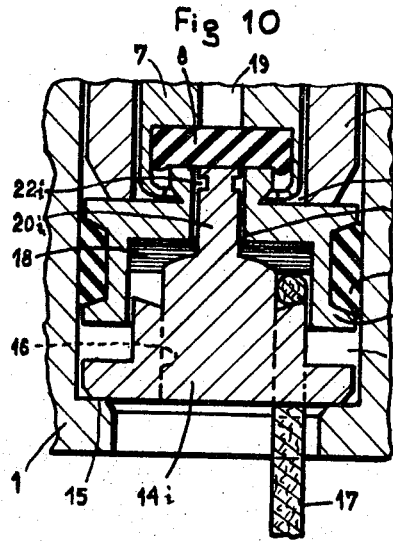
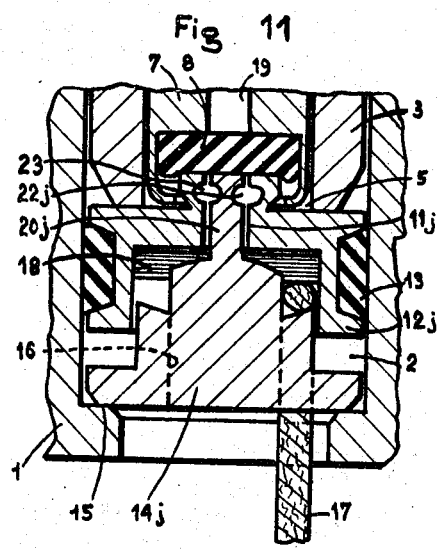
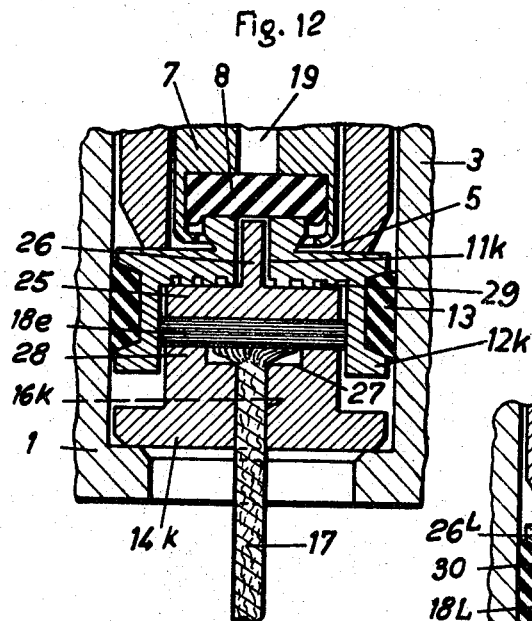
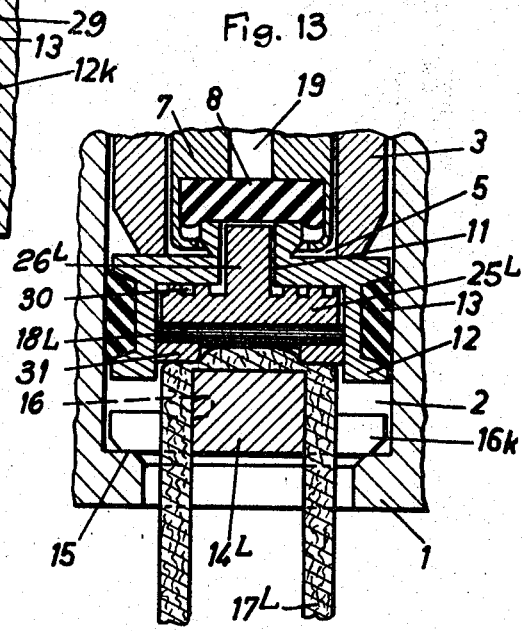
INVENTOR
ROBERT R. HOCQ
by Christy Parmelee & Strickland
attys.

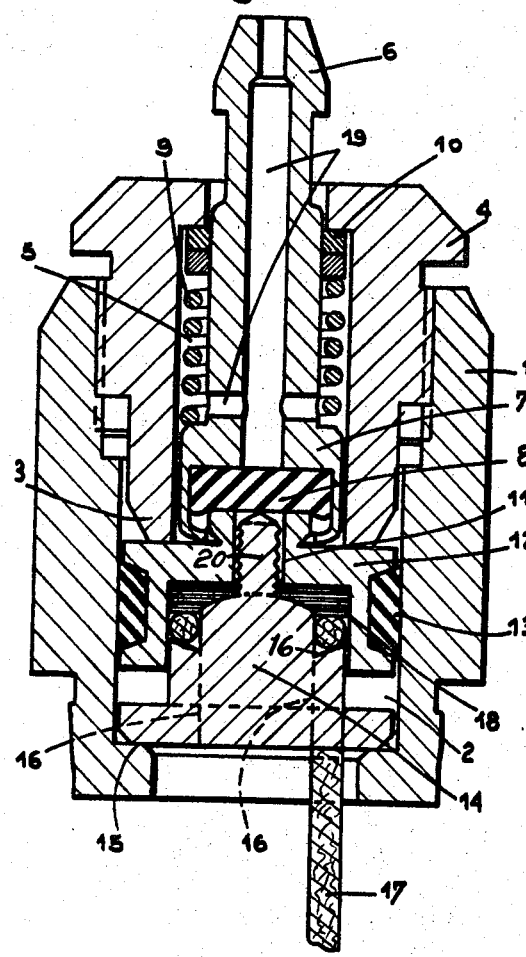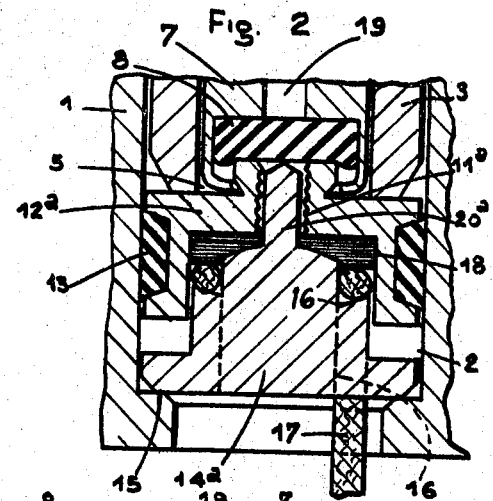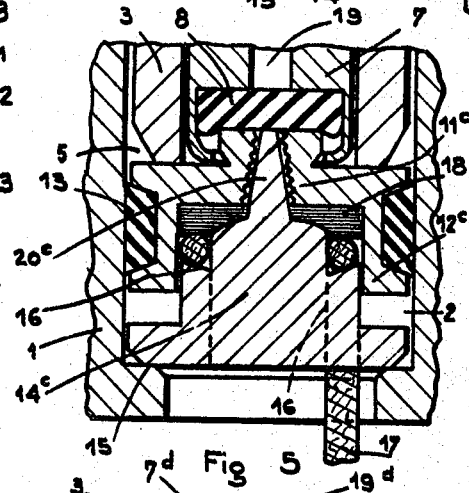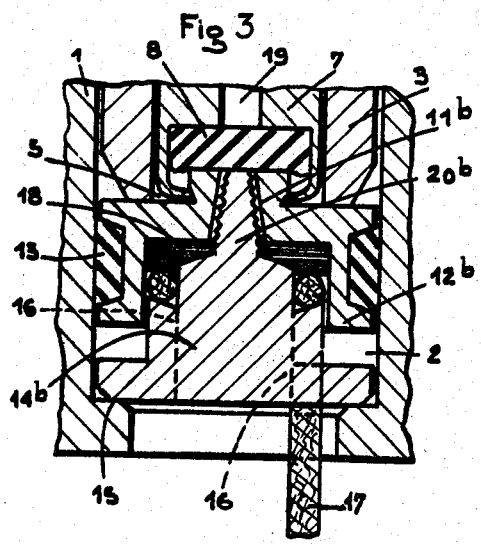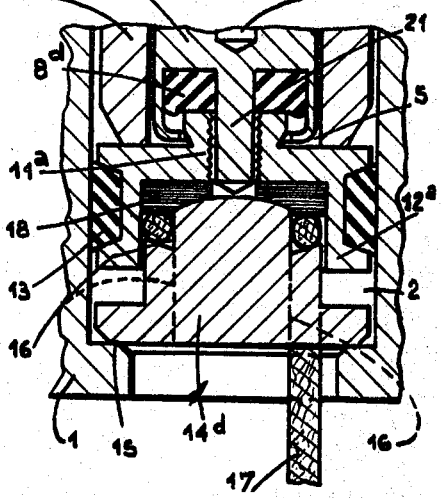

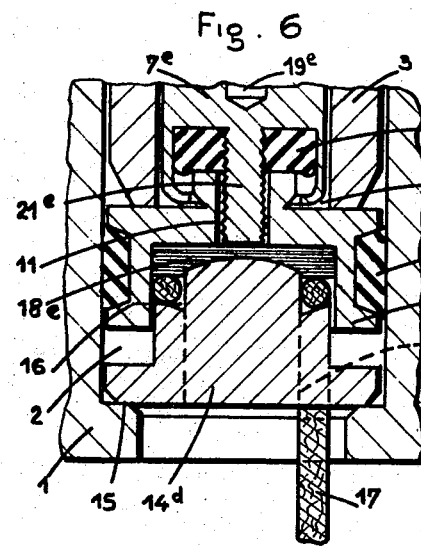
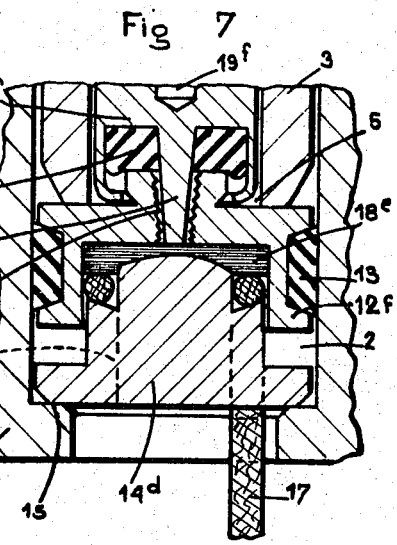
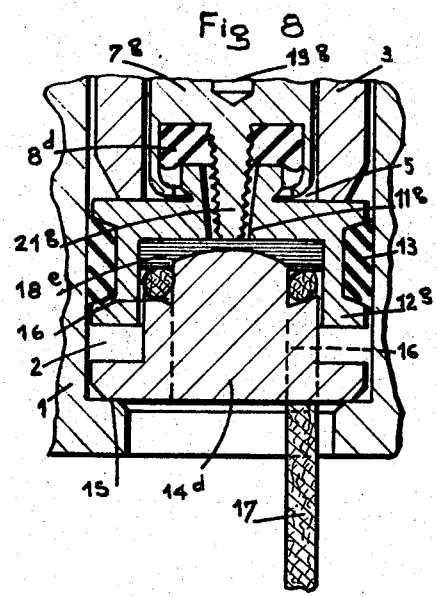
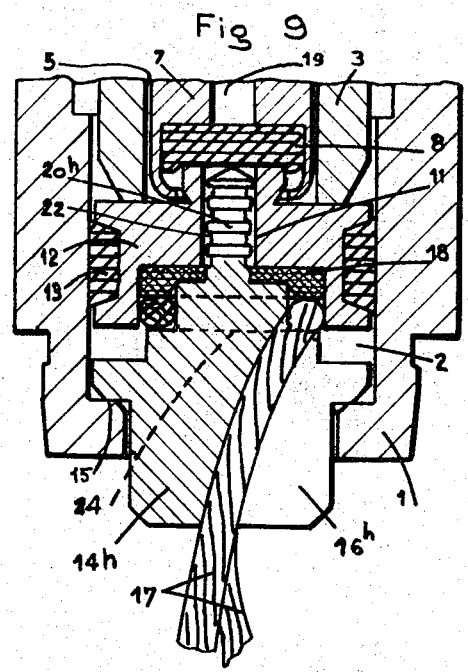

United States Patent Office 3,533,721
Patented Oct. 13, 1970

3,533,721
BURNER VALVE FOR GAS-FUELED PIPE AND CIGARETTE LIGHTERS
Robert R. Hocq, Boulogne-Billancourt, France, assignor to Societe Franco Hispano Americaine Francispam, Paris, France, a company of France
Continuation-in-part of application Ser. No. 595,449, Nov. 18, 1966. This application Apr. 28, 1969, Ser. No. 832,535
Int. Cl. F23d 15/00
U.S. Cl. 431—344
14 Claims

ABSTRACT OF THE DISCLOSURE

This invention relates to combination pipe and cigarette lighters fueled by liquified butane gas fed from a suitable tank to a burner valve, wherein a wick feeds liquified butane to a suitable washer-like porous member from which the vaporizing butane gas is fed through a passageway into the burner valve. The said passage way is formed a alternate short portions having respectively a capillary and a non-capillary section, the said alternate short portions being provided between two cooperating walls one of which has a recessed surface. Each of the successive portions of the passageway are of a very short length and the length of these portions, in the direction of the fuel flow, is approximately the same for the capillary and non-capillary portions, the recesses in the one of the cooperating walls forming expansion chambers.

CROSS-REFERENCE TO RELATED APPLICATION

This application is a continuation-in-part of my copending and now abandoned application Ser. No. 595,449 filed Nov. 18, 1966.

BACKGROUND OF THE INVENTION

Field of the Invention

This invention is directed to cigar and cigarette lighters of the type fueled by liquified butane gas, which is vaporized so as to ignite when exposed to the sparking device of the lighter. The rate at which the liquified fuel vaporizes is controlled by the ambient temperature in which the lighter is being used, since at temperatures below 50° F. the vaporizing fuel may contain droplets of liquid which reach the lighter burner valve causing spurting of the flame.

Description of the Prior Art

U.S. Pat. 3,218,831 dated Nov. 23, 1965 relates to lighters of the type which are fueled by vaporizing of liquified butane gas but contains no construction to insure complete vaporizing of the liquified butane gas at temperatures below 50° F. whereby such vapors and suspended droplets pass through the lighter to burner valve 7 and cause jetting of the flame emitting therefrom.

The U.S. patent to Zellweger No. 3,148,521 discloses an evaporation valve, for a lighter, in which control of the gas flow is effected by more or less screwing a conical screw into a corresponding screw-threaded conical bore, said bore being advantageously made by screwing a steel screw into a smooth hole drilled in a relatively soft material, whereby upon introduction of the screw into the more, the relatively soft material is deformed by the more hard screw so as to form a screw thread corresponding exactly to that of the screw. Thus the helical path provided between the threads of the screw and the threads of the concentric wall of the hole is substantially the same throughout the length of the screw, when said screw is somewhat rotated, due to the small conicity of both cooperating walls. But such a valve device does not operate satisfactorily at the above mentioned low temperatures, because the disclosed regulating means provide a continuous path of constant section, exactly as the corresponding path in the valve according to the U.S. Pat. No. 3,218,831.

British patent to Etablissements Genoud & Cie No. 800,939 discloses a gas-operated lighter wherein the vaporized gas is subjected not only to a first loss of pressure due to its passage through a member disposed in front of a closure member and as near as possible thereto, but also an additional loss of pressure before entering the burner, by reason of its passage through a second member disposed after the said closure member and consisting of at least one-gas-throttling element. In such a valve device, the manner of transforming the liquified gas into vapor is different from that disclosed in the aforesaid U.S. Pat. No. 3,218,831 but the operation of a lighter provided with such a valve is no better at low temperatures.

SUMMARY OF THE INVENTION

The invention is directed to lighters of the type fueled by butane gas stored in liquid form within the lighter casing and vaporizing upon opening the casing cover to deliver butane vapors without containing unvaporized droplets of liquid therein. For this purpose the invention provides a gas flow path comprised of very short alternate portions providing capillary and noncapillary sections. Thus the gas flow is retarded in the capillary section and expands in the non-capillary sections to vaporize droplets therein.

BRIEF DESCRIPTION OF THE DRAWINGS

The invention will be apparent from the following description and the accompanying drawings of the burner valve and evaporation controls, wherein FIG. 1 shows an enlarged vertical section through a valve according to the invention, and FIGS. 2–13 thereof illustrate alternate forms of the path followed by the gas in moving towards the burner head.

DESCRIPTION OF THE PREFERRED EMBODIMENT

Referring now to FIG. 1 showing a vertical cross-section through the valve and burner, the structure includes a vertical cylindrical valve casing 1 the lower portion of which is received and secured in a suitable form of tank (not shown) or other receptacle for holding a liquified gas, such as butane.

Into the threaded upper portion of an axial bore 2. provided in the valve casing 1, is threaded for relative movement, a regulating member 3 terminating at its outer upper end in an enlarged head portion 4 by means of which member 3 may be adjusted from outside the valve casing. Member 3 has a smooth axial bore 5 extending therethrough and terminating adjacent the upper face thereof in a smaller bore for passage of a head or burner portion 6 of a valve shoulder 7 provided with a valve closing member 8. The piston-like valve and burner unit 6, 7, 8 is biased by a spring 9 extending between valve shoulder 7 and sealing gaskets 10 towards a closing position in which valve closing member 8 engages the top end of an axial channel 11 pierced in the bottom of a cylindricall inverted cup-shaped member 12 having recessed in the peripheral side walls thereof a gasket member 13 having a slidable sealing fit with the adjacent peripheral smooth wall of bore 2. A wick holder 14 is seated in an internal flange 15 at the lower end of valve casing 1 and is provided with at least one channel 16 for reception of a wick 17 one end of which depends into the liquified gas contained in the tank (not shown). Wick 17, as shown, is looped around the upper end of holder 14, which has preferably a domed upper face portion. A porous washer 18 of any suitable material such as blotting paper has a bottom face abutting the domed upper face of wick holder 14 and the looped upper end of wick 17 for absorption of liquid gas therefrom and is adjustably compressed between said wick and wick holder on the one hand and the bottom wall of the cup-like member 12 on the other hand when member 3 is more or less threaded in the upper part of axial bore 2, in a known manner, by rotating the enlarged head 4.

The burner head 6 has a restricted neck portion engagable by a suitable lifter, not shown, to lift valve 7 against spring 9 admitting vapors from washer 18 into channel 11 and thence flowing upwardly around valve 7 into bore 5 and through channels 19 pierced in the valve stem to exit through head 6 where it is ignited by a suitable flint and sparking device (not shown). Whenever gas vapors are emitted through head 6, the flame will burn until the head 6 is released by the lifter (not shown) and valve 7 returns to its normal position of FIG. 1 and cuts off the flow of gas in channel 11.

Experience has shown that at ambient temperatures about 59° F. liquified butane gas will vaporize readily and such vapor will burn with a uniform flame. But at temperatures below 50° F. there is a tendency for the liquid in washer 18 to be emitted in the form of droplets of liquid along with gas vapors. These droplets in prior art lighters upon meeting the flame at the open head 6 cause the flame to dance and fluctuate in length.

In the present invention of FIG. 1, in the centerline of the domed upper face of wick holder 14 projects upwardly an extension 20 which has upon its periphery a helical groove extending for the length thereof: extension 20 is received in free sliding relation into the channel 11, the cylindrical inner wall of which is smooth. During low temperature operation, the vapors from washer 18 may carry droplets of liquid into channel 11 surrounding wick holder extension 20. By reason of the relatively close fit between the helical grooves along extension 20 and the adjacent walls of channel 11, these droplets of liquid follow such grooves and vaporize before passing out of channel 11 when valve 7 is raised, thus providing liquid free vapor to burner head 6 and hence a uniform length of flame, regardless of the adjustments which may result from rotation of head portion 4. By reason of wick holder extension 20 being solid, all vapors and droplets must traverse the helical grooves, thus preventing vapor build-up from ejecting droplets into cavity 5 and channel 19.

In other words, liquid fuel contained in washer 18 is caused by the pressure in the tank to flow in droplet form into the capillar passages provided between the crests of the threads forming the helical groove in extension 20, to be partly braked or broken by said crests and to be partly directed into said groove, which form expansion chambers. Thus the gaseous portion of the fuel flow may follow the most direct way through the aforesaid capillary spaces, along the smooth wall of the channel 11, while the droplets are constrained to follow the largest way along the helical groove, and thus to vaporize due to the extended contact with the walls of the groove. If the length of the extension 20 is sufficient, no liquid droplet is allowed to pass beyond valve closing member 8 when open.

Referring now to FIG. 2 of the drawing wherein is shown a modified form of valve, the wick holder 14a is similar to 14 of FIG. 1, except that the extension 20a thereof has a smooth periphery and the channel 11a in member 12a is provided with the helical groove, forming gas expansion chambers.

FIG. 3 is similar to FIG. 1 and shows a further modification of the wick holder, wherein the extension 20b is generally of a truncated cone shape and has a helical groove extending the length thereof, the channel 11b of member 12b conforms therewith but has smooth side walls.

FIG. 4 is similar to FIG. 3, except that the truncated cone shaped extension 20c of wick holder 14c is provided with a smooth periphery and the channel 11c is provided with helical grooved side walls.

FIG. 5 shows a further modification of FIG. 1, wherein the wick holder 14d has no upstanding extension but the valve 7d has a cylindrical depending extension 21 which depends through valve closing member 8d and extends through channel 11a to engage within an aperture formed in washer 18. Here channel 11a has helical grooves formed therein for reception and feeding of vapor and droplets, if any, of liquified gas to channel 5 when the valve 7d with its closing member 8d is raised.

FIG. 6 is similar to FIG. 5 except that extension 21e of valve 7e is provided on its periphery with helical grooves. These grooves communicate with channel 11 of member 12 to feed vapor to bore 5 and channel 19e when valve 7e is raised.

FIG. 7 is similar to FIG. 6, except that extension 21f of valve 7f is in the form of a smooth truncated cone and received in a correspondingly shaped aperture 11f which is provided with helical grooves.

FIG. 8 is similar to FIG. 7, except that the extension 21g of valve 7g is of truncated cone shape having peripheral grooves on the periphery thereof and received in a similarly shaped opening 11g, having smooth side walls.

FIG. 9 is similar to FIG. 1, except that the extension 20h of wick holder 14h is provided with spaced parallel annular grooves 22 and the non-grooved portions thereof have a close free fit with the smooth-walled channel 11 providing for passage of vapor or minute droplets of liquid from the reservoir into which wick ends 17 extends. As shown here the wick 17 is looped about the holder and both wick ends extend into the liquid butane reservoir.

FIG. 10 as shown, is similar to FIG. 1 except that wick holder cylindrical extension 20i has smooth peripheral walls provided intermediate the ends thereof with an annular indentation 22i.

FIG. 11, as shown, is similar to FIG. 10, except that channel 11j of member 12j is provided with an annular indentation 23 opposing the annular indentation 22j of member 20j.

FIG. 12 shows a modified form of wick holder comprised of a bottom portion 14k and a top portion 25 between which is disposed the porous washer 18e. Wick holder portion 14k has a central recess 27 in the top face, defined by shoulders 28 providing support for porous washer 18e. A central aperture in portion 14k receives the upper end of wick 17, the bottom end of which extends into the gas reservoir as previously described. The upper end of the wick 17, within recess 27, is spread beneath and preferably contacts the adjacent face of washer 18e supported upon the wick holder portion 28. The upper half 25 of the wick holder has a cylindrical extension 26 which is received in channel 11k and in spaced relation to the side walls of said channel. The bottom face of wick holder 25 abuts washer 18e. The adjacent face of member 12k has a plurality of concentric or spiral grooves 29 therein overlying the adjacent face of member 25, whereby vapors and droplets of liquified gas from washer 18e pass upwardly around portion 26 within channel 11k as in FIGS. 1 to 11 inclusive.

FIG. 13 shows a further modification of the invention wherein the wick holder 14L has a flat upper face and is provided with two vertical openings 16L through which the wick 17L is threaded up and across said flat upper face. Here a flat washer 31, provided with a central aperture, is mounted over the portion of wick 17L overlying said flat face and pressed downwardly to cause the wick upon said flat face to extrude into said washer aperture to adjacent the upper face of the washer 31. A porous or absorbent washer 18e overlies washer 31 and being compressed during assembly will contact the wick portion within the washer 31 aperture. As in FIG. 12, the upper portion 25L of the wick holder has upon its top face concentric or spiral grooves 30 connecting the periphery 25L with the extension 26L extending into smooth facial channel 11.

In order possible emodiments of the invention, several features of the constructions discolsed and illustrated could also be provided for. For example, in the valves of FIGS. 9 to 13, the extensions 20h, 20i, 20j, 26 or 26L could be frusto-conical, and engage a frusto-conical channel such as 11b. One could also, in other modifications, provide both grooves in cylindrical or frustoconical surfaces 11, 11a, 11b, 11c, 11f, 11g, 11j, 11k or 20, 20a, 20b, 20c, 20h, 20i, 20j, or 21, 21e, 21f, 21g, or 26, 26L such as the helical grooves in FIGS. 1 to 8 or as the grooves 22, 22i, 22j, and 23, and grooves such as 29 or 30. One could also provide for one independent piece inserted in channel 11, 11a, 11b, 11f, 11g, or 11k instead of extensions of the wick holder or o fthe valve.

The burner valves of FIGS. 1 to 13 have a common purpose that is to provide an adjustable uniform flow of a vaporized liquid fuel to the burner valve, which burner valve is adjustable as to the length of flame emitted therefrom. The valve 7, 7d, 7e, 7f, or 7g is common to FIGS. 1 to 13 inclusive, it being understood that burner head 6 is common to each said figures as in FIG. 1. Compression in spring 9 normally seals channel 11, 11a, 11b, 11e, 11f, 11g, 11j, or 11k by maintaining valve closing member 8 or 8d in pressure contact with the outlet end of said channel to prevent vapor from porous washer 18 or 18e entering the valve channels 19. Gaskets 10 under compression of spring 9 between the end of opening 5 and the adjacent end of head 4 prevent accidental displacement of valve 7 and discharge of gas through burner head 6. The volume of gas emitting through valve channels 19 and burner head 6 is controlled by rotation of head 4 relative to valve body portion 1, increasing or decreasing the pressure on absorbent washer 18, counter clockwise rotation decreasing pressure, clockwise rotation increasing pressure. Ambient temperatures prevailing adjacent the liquid fuel container also affect the gas pressure on valve 7.

Whatever the conditions which may increase gas pressure on valve 7, such pressure tends to discharge droplets of liquid along with gas into channel 11 when the valve 8 is raised from its seat upon the outlet end of channel 11 and thus vary the length of flame emitting from the burner head 6. There is only a relatively small clearance between the inside diameter of channel 11 and the outer periphery of the wick holder extension 20 of FIGS. 1 through 4. The helical grooves in the periphery of the extension or the adjacent walls of channel 11 increases the length of travel of gas, with or without droplets therein, between washer 18 and the outlet end of channel 11. Moreover, the contact surface between the fuel and the walls which define the path followed by this fuel is greatly increased, so that the heat exchanges are improved and consequently any liquid droplets in the gas stream have time to evaporate before emitting from channel 11.

FIGS. 5 through 8 mount extensions 21, 21e, 21f and 21g on the base of valve 7 and extending through valve closing member 8d for entrance into channel 11. Such extension have close clearance with the corresponding channels and one of the cooperating, concentric walls is provided with helical grooves for the same purpose as in FIGS. 1 through 4 while the other surface is smooth. FIGS. 9 through 11 provide similar provisions for evaporation of droplets in the vapor stream before exiting through channel 11. FIGS. 12 and 13 in effect split the wick holder horizontally and place the absorbent washer 18 or 18e between the two halves. One of the cooperating flat surfaces has concentric or spiral grooves through which the gas vapor and any droplets therein flow to effect complete vaporation before entering channel 19 of the burner.

It is to be clearly pointed out that in every embodiment of the invention, as a main feature of said invention, the space between the smooth cooperating wall and the crests or edges of the grooves in the other cooperating wall is capillar, while the grooves form expansion chambers for the liquid droplets.

I claim:

1. In a valve unit of a gas-fueled cigarette lighter of the character described, for controlling the feed of substantially liquid free gaseous vapors from a liquid filled fuel tank to the lighter burner head, in combination,
    (a) a wick holder having an upstanding recessed central portion for engagement by a wick connected with said fuel tank for the feeding of liquid fuel from the tank to the wick holder,
    (b) a porous washer enclosing the bottom portion of said holder upstanding central portion and in contact with said wick for absorbing liquid fuel therefrom,
    (c) a vertical cylindrical extension on said wick holder and provided with a plurality of vertically spaced peripheral recesses thereon, and
    (d) a closure member encircling said wick holder and having an elongated central opening therethrough receiving said wick holder vertical extension in closely spaced relation thereto whereby liquid droplets suspended in said vapors flowing through said elongated central opening may enter said vertically spaced peripheral recesses for vaporation before passing to the lighter burner head.

2. The cigarette lighter valve unit as defined in claim 1 wherein said wick holder cylindrical vertical extension has a smooth exterior face and the closure member central opening receiving said wick holder vertical extension has a plurality of vertically spaced annular recesses therein whereby liquid droplets in said vapors from said liquid fuel tank are vaporized before flowing to the lighter burner head portion.

3. In a valve unit for a lighter operating with liquified gas, said unit presenting a partially capillar outlet passage from a gas container to a burner nozzle, in which passage there is included a choking device shaped as a rigid piston-like inverted cup containing a thin porous washer and preferably adjustable from the outside, for controlled restriction of the amount of discharge gas, and a closing device for alternative opening and closing of the passage toward the burner nozzle, the improvement which consists in that the section of said outlet passage, which extends between the choking device and the closing device, is deprived of any porous packing or similar filtering element and is formed between an internal surface on said piston-like cup and an external surface on a rigid body introduced therein, at least one of the two opposing surfaces being provided with recesses forming widened cavities, and the interspace between the two surfaces for the rest being capillar, so that the gas along its shortest way through the said outlet passage up to said closing device is caused to successively pass capillary passage and said widened cavities serving as expansion chambers, and if said closing device is open, may freely flow to the burner nozzle.

4. In a valve unit of a gas-fueled cigarette lighter of the character described, for controlling the feed of substantially liquid free gaseous vapors from a liquid filled fuel tank to the light burner nozzle, in combination,
    (a) a rigid wick holder having a portion for engagement by a wick connected with said fuel tank for the feeding of a liquid fuel from the tank to the wick holder,
    (b) a porous washer carried by said holder and in contact with said wick for absorbing liquid fuel therefrom, (c) a closure member encircling said wick holder and having an elongated central opening therethrough, (d) a central rigid core member fixedly received in said elongated central opening in closely spaced relation thereto, and (e) expansion chambers forming recesses in any one of the cooperating surfaces of said wick holder and of said closure chamber, the other of said cooperating surfaces being smooth, whereby liquid droplets suspended in said vapors flowing toward and through said elongated central opening may enter said expansion chambers forming spaced recesses for vaporization before passing to the lighter burner nozzle upon opening of the burner closing device.

5. In a valve unit of a gas-fueled cigarette lighter of the character described, for controlling the feed of substantially liquid free gaseous vapors from a liquid filled fuel tank to the lighter burner nozzle, in combination, (a) a rigid wick holder having an upstanding recessed central portion for engagement by a wick connected with said fuel tank for the feeding of liquid fuel from the tank to the wick holder, (b) a porous washer laying on the upper end portion of said holder upstanding central portion and in contact with said wick for absorbing liquid fuel therefrom, (c) a closure member encircling said wick holder and having an elongated central opening therethrough, (d) a vertical rigid core member fixedly received in said elongated central opening in closely spaced relation thereto, and (e) peripheral expansion chambers-forming recesses in any one of the cooperating surfaces of said elongated central opening and of said vertical core member, the other of said cooperating surfaces being smooth, whereby liquid droplets suspended in said vapors flowing through said elongated central opening may enter said peripheral recesses for vaporization before freely and directly passing to the lighter burner nozzle upon opening of the burner closing device.

6. The cigarette lighter valve unit as defined in claim 5 wherein said peripheral expansion chambers-forming recesses are shaped as a peripheral helical groove.

7. The cigarette lighter valve unit as defined in claim 5 wherein said peripheral expansion chambers-forming recesses are vertically spaced.

8. The cigarette lighter valve unit as defined in claim 5, wherein said elongated central opening and said vertical core member are of cylindrical shape.

9. The cigarette lighter valve unit as defined in claim 5 wherein said elongated central opening and said vertical core member are of conical shape.

10. The cigarette lighter valve unit as defined in claim 5, wherein said vertical core member is formed as a vertical extension on said wick holder.

11. The cigarette lighter valve unit as defined in claim 5, wherein said vertical core member is formed as a vertical extension depending from said burner head towards said wick holder.

12. In a valve unit of a gas-fueled cigarette lighter of the character described, for controlling the feed of substantially liquid free gaseous vapors from a liquid filled fuel tank to the lighter burner nozzle, in combination, (a) a rigid wick holder having a bottom portion for engagement by a wick connected with said fuel tank for the feeding of liquid fuel from the tank to the wick holder, and a top portion, (b) a porous washer laying between the upper face of the bottom portion and the lower face of the top portion of said wick holder and in contact with said wick for absorbing liquid fuel therefrom, (c) a smooth vertical cylindrical extension on the top portion of said wick holder, (d) a closure member encircling said wick holder and having an elongated central opening therethrough receiving said wick holder vertical extension in closely spaced relation thereto, and (e) grooves provided in any one of the cooperating upper surfaces of said top portion of said wick holder and lower inner surface of said closure member, the other of said cooperating surfaces being smooth, whereby liquid droplets suspended in said vapors flowing through the annular clearance provided between the cooperating surfaces of the inner cylindrical wall of said closure member and of the outer cylindrical wall of said wick holder towards said elongated central opening may enter said grooves for vaporization before freely and directly passing to the lighter burner nozzle upon opening of the burner closing device.

13. The cigarette lighter valve unit as defined in claim 12, wherein said grooves are concentric ones.

14. The cigarette lighter valve unit as defined in claim 12, wherein said grooves are spiral ones.

References Cited

UNITED STATES PATENTS

| 2,612,033 | 9/1952 | Flamm | 431—140 X |
| 2,652,707 | 9/1953 | Reilly | 431—130 |
| 3,148,521 | 9/1964 | Zellweger | 62—50 |
| 3,198,237 | 8/1965 | Sadler | 431—344 |
| 3,301,019 | 1/1967 | Meylan | 431—131 X |

FOREIGN PATENTS 800,939  9/1958  Great Britain.

EDWARD J. MICHAEL, Primary Examiner

U.S. Cl. X.R.

138—43